(12) United States Patent
Tsai

(10) Patent No.: US 8,136,940 B2
(45) Date of Patent: Mar. 20, 2012

(54) EYEGLASSES HAVING A TEMPLE MOUNTING STRUCTURE

(76) Inventor: Tsung-Meng Tsai, Tainan (TW)

( * ) Notice: Subject to any disclaimer, the term of this patent is extended or adjusted under 35 U.S.C. 154(b) by 96 days.

(21) Appl. No.: 12/797,848

(22) Filed: Jun. 10, 2010

(65) Prior Publication Data

US 2011/0157542 A1 Jun. 30, 2011

(30) Foreign Application Priority Data

Dec. 31, 2009 (TW) .............................. 98224985 U

(51) Int. Cl.
*G02C 5/14* (2006.01)

(52) U.S. Cl. ........................................ 351/120; 351/121
(58) Field of Classification Search .................. 351/111, 351/119, 120, 121, 153
See application file for complete search history.

(56) References Cited

U.S. PATENT DOCUMENTS 6,474,813 B1 * 11/2002 Yeh ............................... 351/120

* cited by examiner

*Primary Examiner* — Huy K Mai
(74) *Attorney, Agent, or Firm* — Ohlandt, Greeley, Ruggiero & Perle, LLP

(57) ABSTRACT

A pair of eyeglasses include a lens frame unit having a pair of lateral sides, a pair of temples, and a pair of pivot connection units. Each pivot connection unit rotatably couples a corresponding one of the temples to a corresponding one of the lateral sides of the lens frame unit. Each of the pivot connection units includes a coupling seat coupled to the corresponding one of the lateral sides of the lens frame unit, and a pivoting section formed on one end of the corresponding one of the temples. Each pivot connection unit further includes an axle formed on one of the pivoting section and the coupling seat and extending along a horizontal pivot axis. The other one of the coupling seat and the pivoting section is formed with an axle opening through which the axle is rotatably inserted.

10 Claims, 7 Drawing Sheets

EYEGLASSES HAVING A TEMPLE MOUNTING STRUCTURE

CROSS-REFERENCE TO RELATED APPLICATION

This application claims priority to Taiwanese Application No. 098224985, filed on Dec. 31, 2009, the disclosure of which is herein incorporated by reference.

BACKGROUND OF THE INVENTION

1. Field of the Invention

The invention relates to a pair of eyeglasses, more particularly to a pair of eyeglasses having a temple mounting structure.

2. Description of the Related Art

Conventional eyeglasses may include temples that rotate around vertical axes and that may not be adjusted according to a user's preference. The conventional eyeglasses may therefore be uncomfortable or ill fitting. In addition, the conventional eyeglasses may be difficult, time consuming, or costly to assemble, and may therefore be further improved.

SUMMARY OF THE INVENTION

An object of the present invention is to provide eyeglasses having a temple mounting structure that facilitates assembly.

Accordingly, a pair of eyeglasses of this invention include a lens frame unit having a pair of lateral sides, a pair of temples, and a pair of pivot connection units. Each pivot connection unit rotatably couples a corresponding one of the temples to a corresponding one of the lateral sides of the lens frame unit. Each of the pivot connection units includes a coupling seat coupled to the corresponding one of the lateral sides of the lens frame unit, and a pivoting section formed on one end of the corresponding one of the temples.

Each pivot connection unit further includes an axle formed on one of the pivoting section and the coupling seat and extending along a horizontal pivot axis. The other one of the coupling seat and the pivoting section is formed with an axle opening through which the axle is rotatably inserted to permit rotation of the pivoting section relative to the coupling seat about the horizontal pivot axis.

Each pivot connection unit also includes a first engaging portion disposed on the other one of the pivoting section and the coupling seat and extending into the axle opening. In addition, each pivot connection unit includes a second engaging portion extending radially and outwardly from the axle and cooperating with the first engaging portion to resist movement of the pivoting section relative to the coupling seat along the horizontal pivot axis.

A pair of eyeglasses of this invention further include a pair of limiting units, each limiting angular movement between the pivoting section of a corresponding one of the pivot connection units and the coupling seat of the corresponding one of the pivot connection units.

Each of the limiting units includes a channel structure and a stop. The channel structure is formed on one of the coupling seat and the pivoting section of the corresponding one of the pivot connection units. The channel structure has an entry end and a blocking end that are vertically opposite to each other. The stop is formed on the other one of the coupling seat and the pivoting section of the corresponding one of the pivot connection units. The stop is extended into the channel structure via the entry end, and is movable in the channel structure between the entry end and the blocking end. The stop is limited from further movement in the channel structure by the blocking end.

The pivot connection units of the eyeglasses according to this invention facilitate assembly of the temples to the lens frame unit of the eyeglasses.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
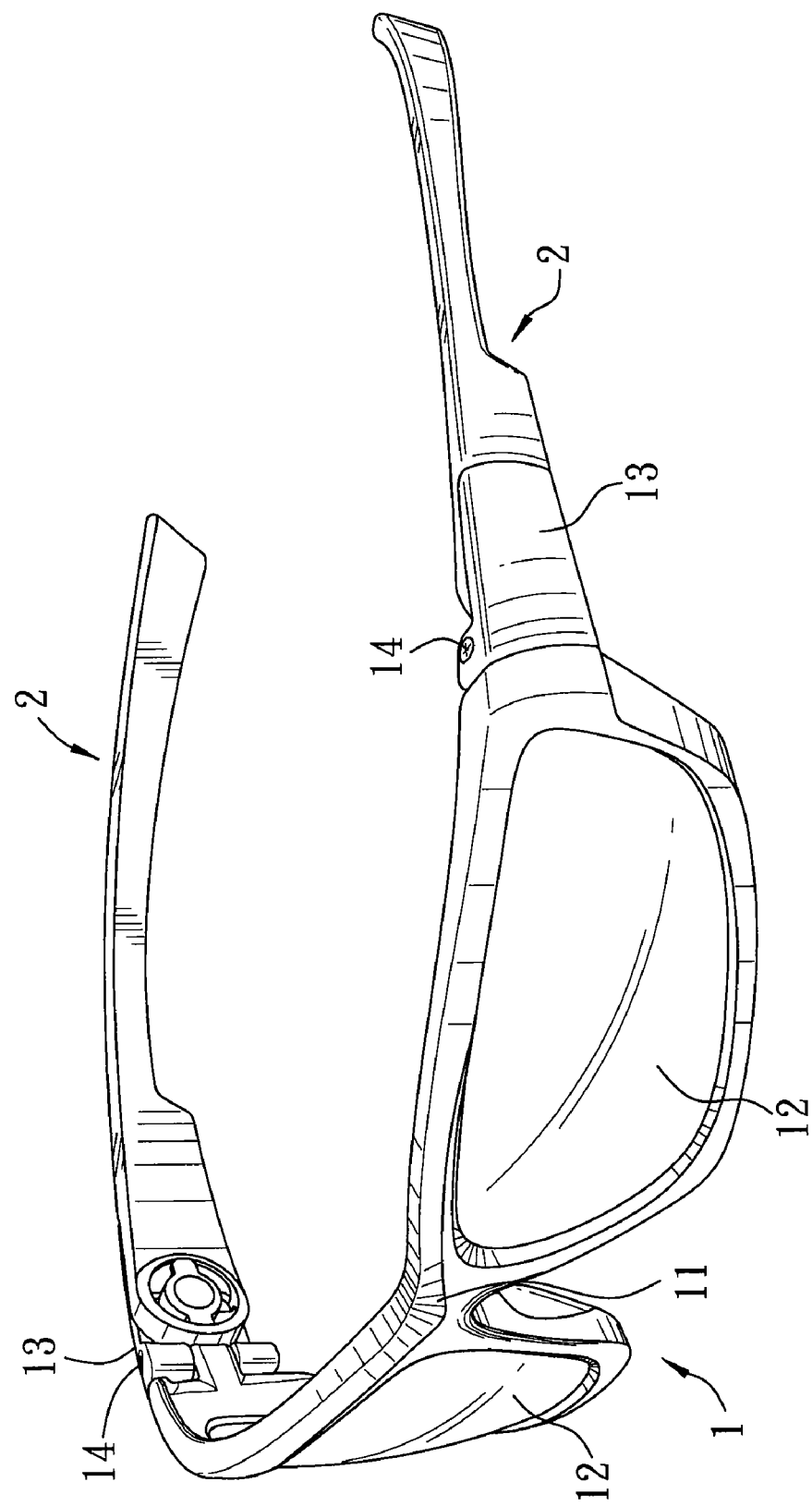
FIG. 1 is a perspective view of eyeglasses having a temple mounting structure according to the preferred embodiment of the present invention.

As shown in FIG. 1, the preferred embodiment of a pair of eyeglasses with a temple mounting structure according to the present invention comprises a lens frame unit 1, a pair of temples 2, each disposed at a respective lateral side of the lens frame unit 1, and a pair of pivot connection units 3. Each pivot connection unit 3 is disposed between and rotatably couples a corresponding temple 2 and the lens frame unit 1. The pair of eyeglasses further include a pair of limiting units 4A (shown in FIG. 2), and a pair of positioning units 4B (shown in FIG. 2). In the following description, the side of the lens frame unit 1 that faces a wearer's face (not shown in the Figure) is defined as an inner side. The side of the lens frame unit 1 opposite to the inner side is defined as an outer side.

The lens frame unit 1 includes a frame 11, a pair of lenses 12 mounted side by side to the frame 11, and two pivot axles 14. Each pivot connection unit 3 includes a corresponding coupling seat 13 coupled to a respective lateral side of the frame 11. Each pivot axle 14 pivotably connects a respective one of the coupling seats 13 to the frame 11 and extends along a vertical axis. In this embodiment, each coupling seat 13 is operable to be pivoted inward about the corresponding pivot axle 14 to fold the corresponding temple 2 toward the frame 11.

In variations of the preferred embodiment, the coupling seats 13 may be pivoted around the pivot axles 14 in other directions, fixed to the lens frame unit 1, or integrally formed with the edges of the frame 11. Accordingly, the pivot connection structure between the coupling seats 13 and the frame 11 is not limited to what is disclosed. Moreover, in this embodiment, the lens frame unit 1 supports a pair of lenses. In variations of the preferred embodiment, the type of the lens frame unit 1 may be altered and is not limited to the disclosed embodiment and variations.

Figure 2:
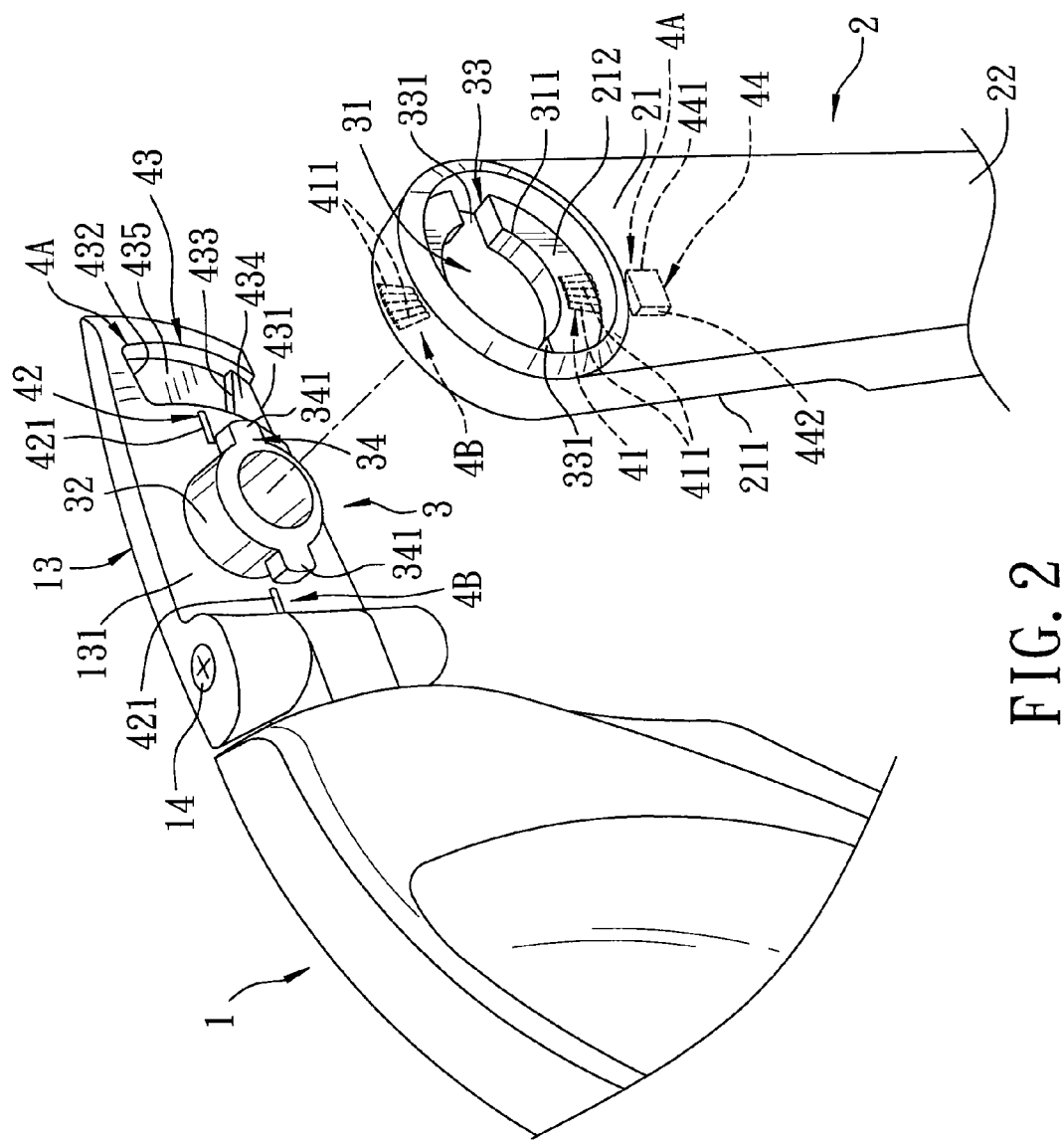
FIG. 2 is a fragmentary partly exploded perspective view illustrating a temple disposed at an assembly position, according to the preferred embodiment.
Figure 3:
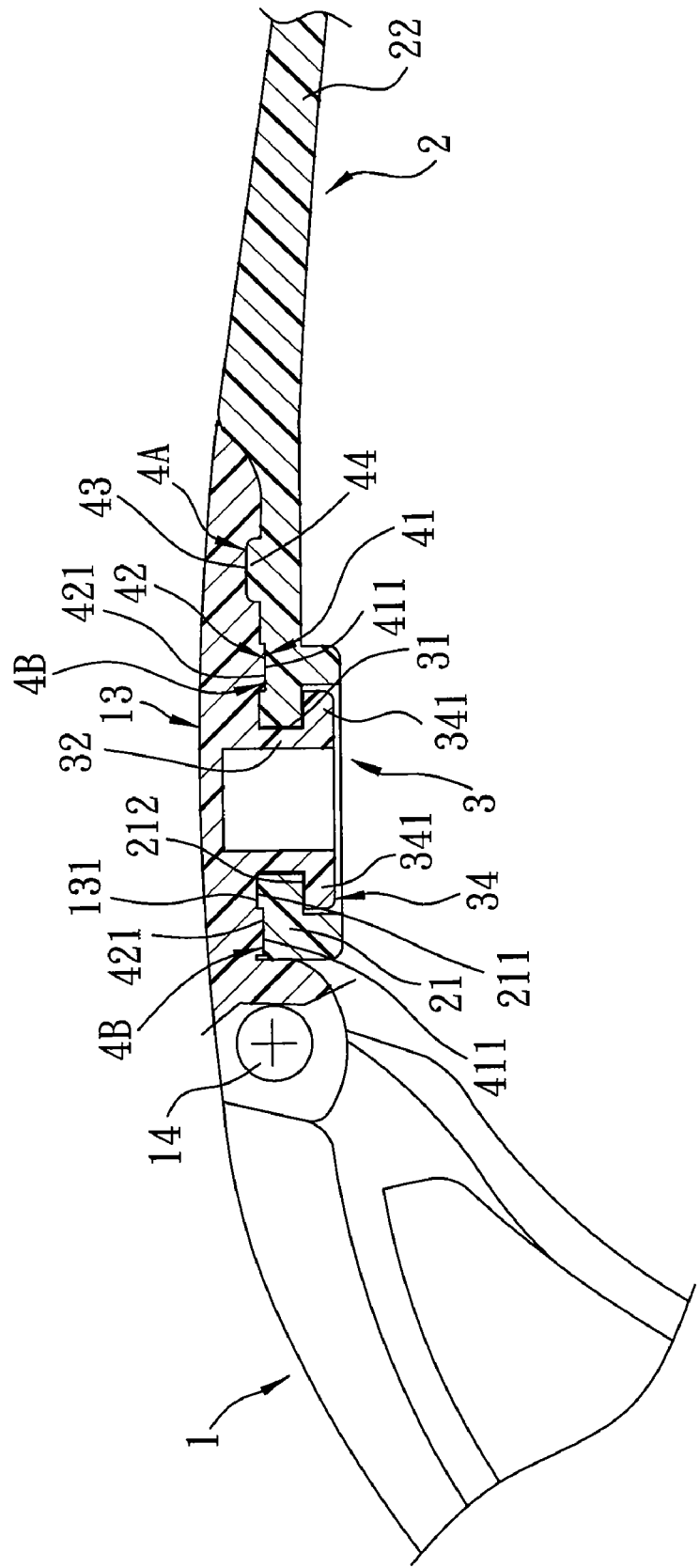
FIG. 3 is a fragmentary partly schematic sectional view illustrating the temple disposed at a mounted position, according to the preferred embodiment.
Figure 4:
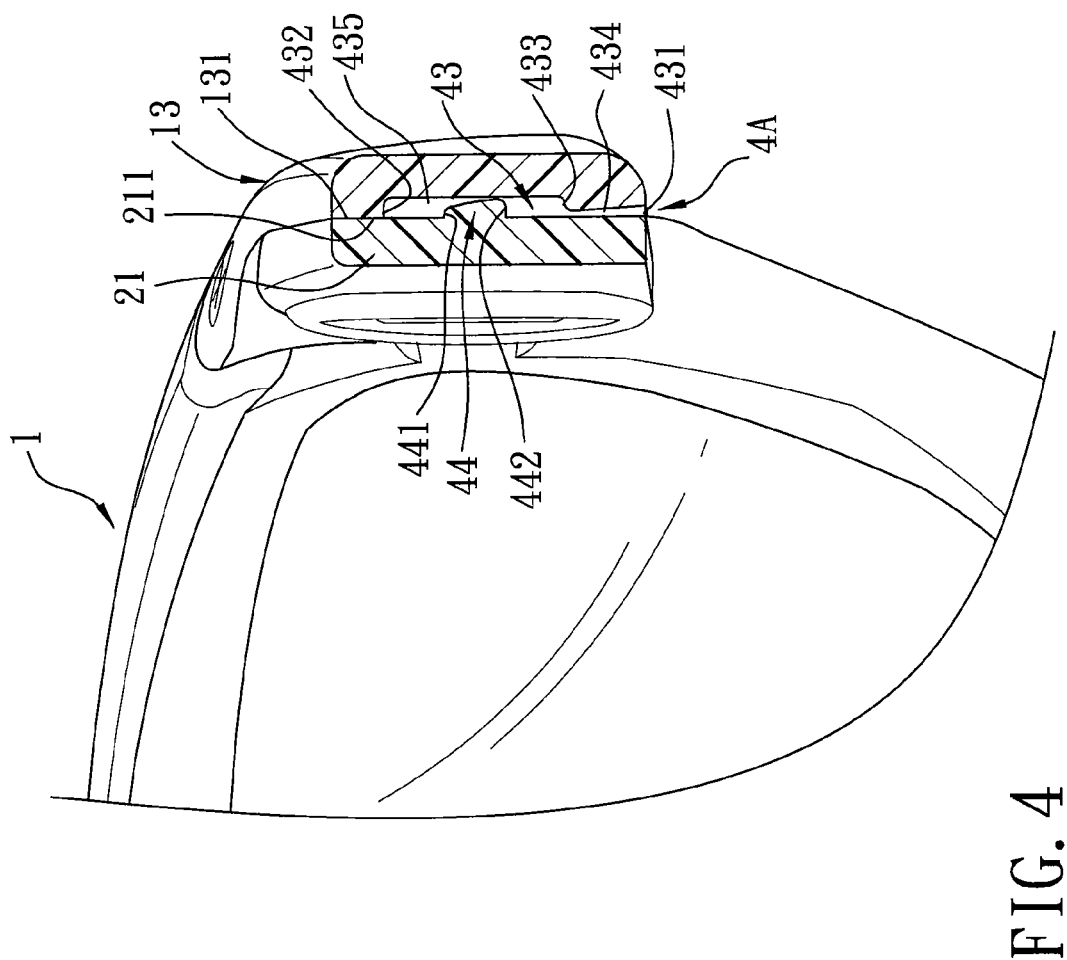
FIG. 4 is another fragmentary partly schematic sectional view illustrating the temple disposed at the mounted position, according to the preferred embodiment.

Referring to FIGS. 2 through 7, the left and right sides of the pair of eyeglasses of the preferred embodiment are structurally symmetric. Therefore, only the structure of the right side of the preferred embodiment is illustrated and described. Referring to FIGS. 2 through 4, the coupling seat 13 of each pivot connection unit 3 includes an inner coupling face 131 that may be positioned to face inward toward the other one of the coupling seats 13.

Each pivot connection unit 3 includes a corresponding pivoting section 21 formed on one end of a corresponding temple 2 and connected pivotally to a corresponding coupling seat 13. The corresponding temple 2 is integrally formed with an elongate part 22 that extends away from a rear side of the corresponding pivoting section 21. The elongate part 22 may extend in other directions or may have a telescopic relation with the corresponding pivoting section 21 in other embodiments.

Each pivoting section 21 includes an abutment face 211 that confronts a corresponding coupling face 131, and a blocking face 212 opposite to the abutment face 211. In this embodiment, the abutment face 211 and the blocking face 212 are integrally formed on the pivoting section 21. In variations of the preferred embodiment, however, the abutment face 211 and the blocking face 212 may be attached or coupled to the pivoting section 21, and are not limited to what is disclosed. In FIG. 2, the temple 2 is oriented such that the elongate part 22 is extended downward.

Each pivot connection unit 3 includes a structure that enables engagement between the corresponding pivoting section 21 and the corresponding coupling seat 13. In particular, each pivoting section 21 is formed with an axle opening 31 that extends along a corresponding horizontal pivot axis through the abutment face 211 and the blocking face 212. Each pivot connection unit 3 further includes an axle 32 formed on the inner coupling face 131 of the corresponding coupling seat 13. The axle 32 may be rotatably inserted into the corresponding axle opening 31 to permit rotation of the pivoting section 21 relative to the coupling seat 13 about the horizontal pivot axis. In variations of the preferred embodiment, the positions of the axle 32 and the axle opening 31 may be switched.

Each pivot connection unit 3 also includes a first engaging portion 33 that extends into the axle opening 31 from the corresponding pivoting section 21, and a second engaging portion 34 that extends radially and outwardly from a lateral side of the axle 32. The first engaging portion 33 is formed with a pair of engaging channels 331, each in spatial communication with the axle opening 31 and disposed at one of two opposite sides of the axle opening 31. The second engaging portion 34 includes a pair of engaging blocks 341, each extending from a corresponding one of two opposite lateral sides of the axle 32 and being sized for movement through a corresponding engaging channel 331.

Each first engaging portion 33 and the corresponding second engaging portion 34 permit movement of the corresponding pivoting section 21 relative to the corresponding coupling seat 13 along the corresponding horizontal pivot axis when the corresponding engaging block 341 is aligned with the corresponding engaging channel 331 in a direction parallel to the corresponding horizontal pivot axis. In variations of the preferred embodiment, one or more of each of the engaging blocks 341 and the engaging channels 331 may be implemented, and are not limited to the numbers disclosed by the preferred embodiment and its variations.

Each positioning unit 4B is used to maintain a selected relative angular position between a corresponding coupling seat 13 and a corresponding pivoting section 21. Each positioning unit 4B includes a first positioning portion 41 formed on the abutment face 211 of the corresponding pivoting section 21, and a second positioning portion 42 formed on the inner coupling face 131 of the corresponding coupling seat 13. In variations of the preferred embodiment, the positions of the first positioning portion 41 and the second positioning portion 42 can be switched with each other.

Each of the first positioning portions 41 is formed with a plurality of indentations 411 angularly spaced apart around a corresponding pivot connection unit 3. The corresponding second positioning portion 42 includes two protrusions 421, each capable of engaging removably a corresponding indentation 411. The indentations 411 are subdivided into front and rear groups. The protrusions 421 are correspondingly disposed at front and rear locations such that each protrusion 421 may engage the indentations 411 in a corresponding group. In variations of the preferred embodiment, the number of protrusions 421 or indentations 411 may be one or more, and the protrusions 421 and the indentations 411 may engage at only one of the front and the rear locations. The indentations 411 of the first positioning portion 41 and the protrusions 421 of the second positioning port ion 42 are thus operable to engage each other to maintain the relative angular position of the corresponding temple 2 and the corresponding coupling seat 13.

Each limiting unit 4A is used to limit the relative angular position between a corresponding coupling seat 13 and a corresponding pivoting section 21. Each limiting unit 4A includes a channel structure 43 formed on the inner coupling face 131 and disposed at a side of the axle 32 distal from the corresponding pivot axle 14. Each limiting unit 4A further includes a stop 44 formed on the abutment face 211 and extended to slidably engage a corresponding channel structure 43. In variations of the preferred embodiment, the positions of each channel structure 43 and the corresponding stop 44 can be switched with each other.

Each channel structure 43 includes an entry end 431 in spatial communication with a bottom side of the channel structure 43, and a blocking end 432 disposed above the entry end 431. The entry end 431 and the blocking end 432 may be vertically opposite each other. The entry end 431 may be above the blocking end 432 in other embodiments of the invention.

Each channel structure 43 further includes a shoulder 433 disposed between the entry end 431 and the blocking end 432, a guide channel 434 disposed between the entry end 431 and the shoulder 433, and a limiting channel 435 disposed between the blocking end 432 and the shoulder 433. The depth of the guide channel 434 measured parallel to the corresponding horizontal pivot axis gradually decreases from the entry end 431 to the shoulder 433. The limiting channel 435 has a depth that is deeper than the depth of the guide channel 434 at the shoulder 433. The depth of the limiting channel 435 may be the depth of the guide channel 434 at the entry end 431.

The stop 44 has an upper portion or first side formed with a first abutment part 441 and a lower portion or second side formed with a second abutment part 442. The second abutment part 442 may have a thickness, measured parallel to the corresponding horizontal pivot axis, that is larger than that of the first abutment part 441.

Figure 5:
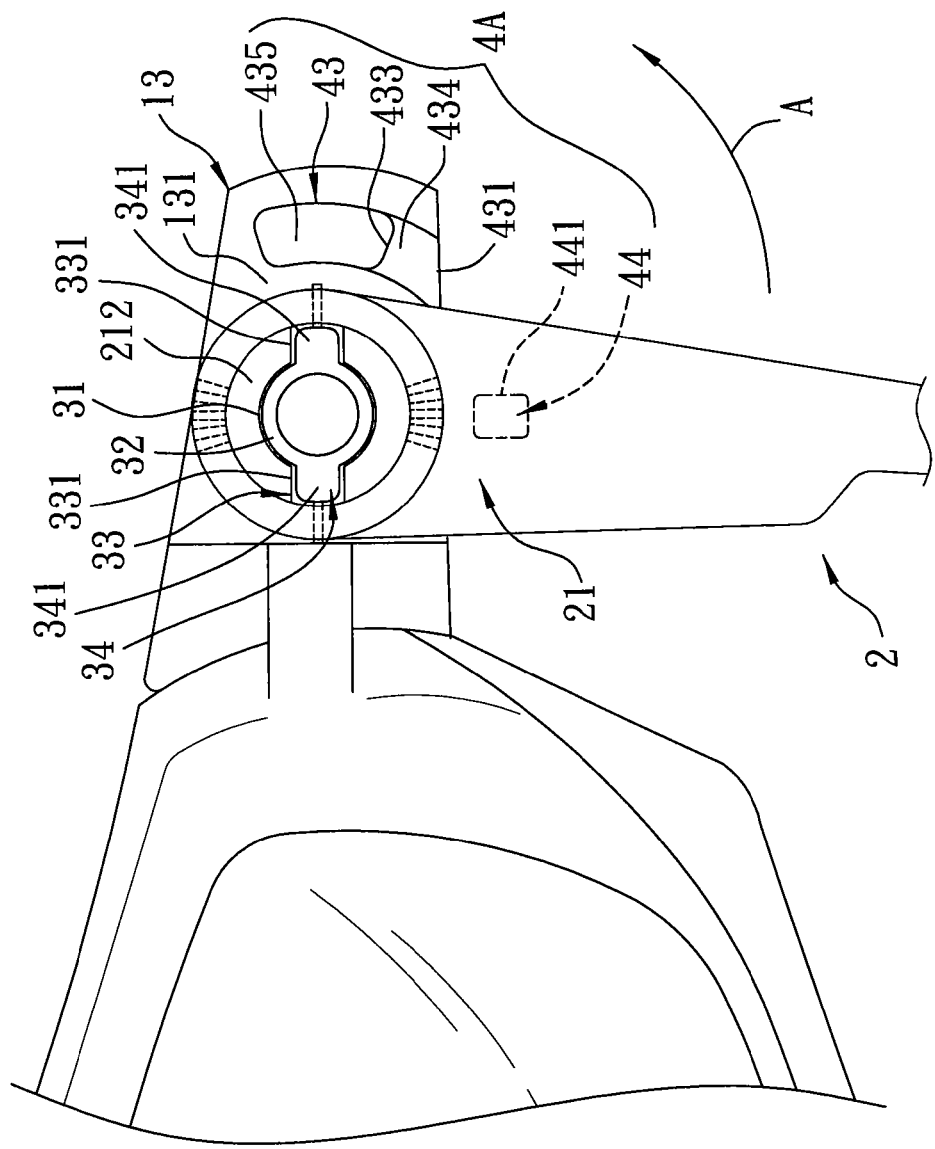
FIG. 5 is a fragmentary view illustrating the temple disposed at the assembly position, according to the preferred embodiment.

Referring to FIGS. 2 and 5, for assembly of the eyeglasses, one of the temples 2 may be moved to an assembly position. In the preferred embodiment, the temple 2 is disposed at the assembly position when the corresponding elongate part 22 of the temple 2 is extended downward. At the assembly position, the corresponding axle opening 31 of the corresponding pivoting section 21 is aligned with the corresponding axle 32 of the corresponding coupling seat 13, and each corresponding engaging channel 331 is aligned with a respective engaging block 341 of the corresponding second engaging portion 34. In variations of the preferred embodiment, the assembly position may be at any relative angle between the temple 2 and the corresponding coupling seat 31.

Next, the corresponding pivoting section 21 is moved toward the corresponding coupling seat 13 such that each engaging block 341 is passed through the respective engaging channel 331, and the corresponding axle 32 is inserted into the corresponding axle opening 31. In addition, the corresponding abutment face 211 is moved adjacent to the corresponding inner coupling face 131. The temple 2 is then pivoted upward around the corresponding axle 32 in the direction of the arrow (A) as illustrated in FIG. 5. Pivoting the temple 2 results in each corresponding engaging block 341 of the corresponding second engaging portion 34 being out of alignment with the respective engaging channel 331. The corresponding engaging blocks 341 are thus located adjacent to the corresponding blocking face 212, as shown in FIG. 3. The abutment of the corresponding engaging blocks 341 of the second engaging portion 34 against the blocking face 212 of the corresponding first engaging portion 33 resists movement of the pivoting section 21 away from the corresponding coupling seat 13 along the corresponding horizontal pivot axis.

Figure 6:
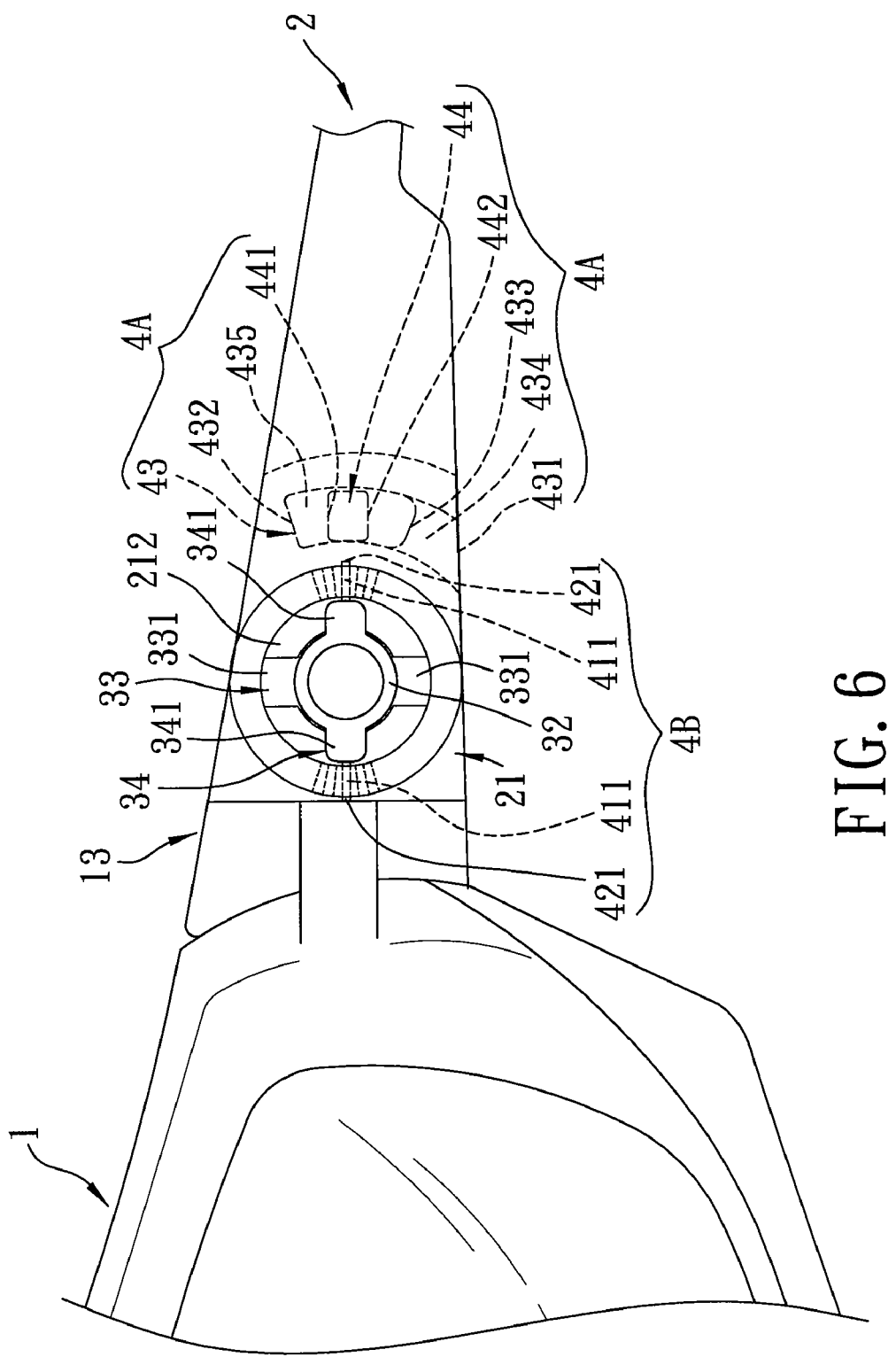
FIG. 6 is another fragmentary view illustrating the temple disposed at the mounted position, according to the preferred embodiment.

As shown in FIGS. 4, 5, and 6, when the temple 2 is sufficiently rotated upward in the direction of the arrow (A) of FIG. 5, the corresponding first abutment part 441 of the corresponding stop 44 is guided toward the corresponding guide channel 434 from the corresponding entry end 431. A user may apply a slight force to the temple 2 to move the corresponding stop 44 along the corresponding guide channel 434. When the corresponding second abutment part 442 is moved past the corresponding shoulder 433, the corresponding stop 44 is guided by the corresponding guide channel 434 into the corresponding limiting channel 435. As shown in FIG. 6, when the corresponding stop 44 is in the corresponding limiting channel 435, each corresponding protrusion 421 may engage a respective indentation 411 to maintain the relative angle between the temple 2 and the corresponding coupling seat 13. Accordingly, the temple 2 may be moved from the assembly position as shown in FIGS. 2 and 5 to a mounted position as shown in FIGS. 3 and 6. At the mounted position, the corresponding pivoting section 21 of the corresponding pivot connection unit 3 is proximate to the corresponding coupling seat 13, and the corresponding elongate part 22 of the temple 2 is extended horizontally away from the corresponding coupling seat 13.

Figure 7:
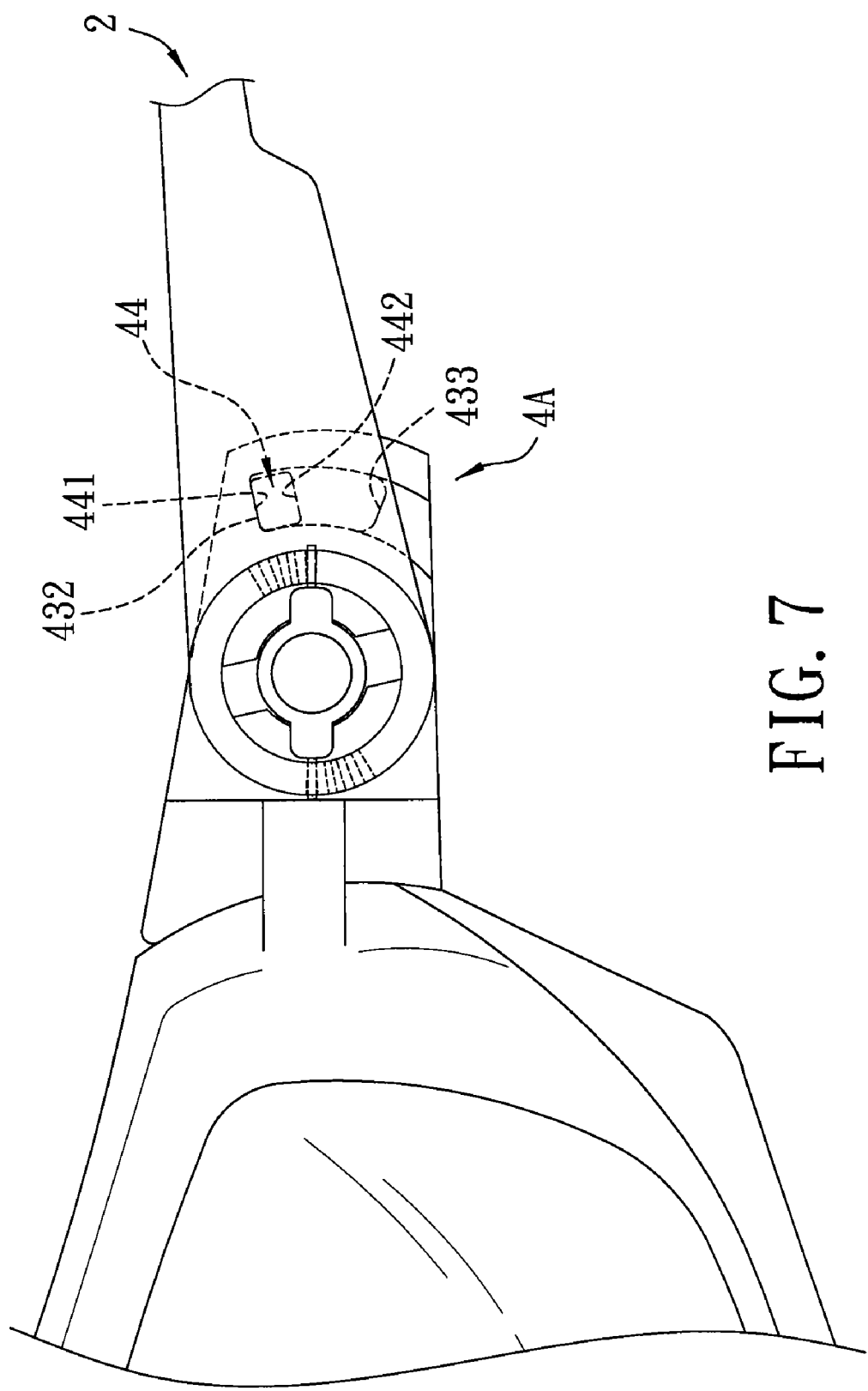
FIG. 7 is yet another fragmentary view illustrating the temple at an upper limit position, according to the preferred embodiment.

At the mounted position, the temple 2 may be pivoted around the corresponding horizontal pivot axis of the corresponding axle 32 relative to the corresponding coupling seat 13. The relative angle between the temple 2 and the corresponding coupling seat 13 may be maintained when each corresponding protrusion 421 engages the corresponding indentation 411. The relative angle between the temple 2 and the coupling seat 13 may be limited at an upward angle in the direction of the arrow (A) of FIG. 5 when the temple 2 is moved to an upper limit position. At the upper limit position, the corresponding stop 44 is at a first end of the corresponding limiting channel 435 with the first abutment part 441 abutting against the corresponding blocking end 432, as best shown in FIG. 7. The relative angle between the temple 2 and the corresponding coupling seat 13 may be limited at a downward angle when the temple 2 is moved in the direction opposite the arrow (A) of FIG. 5 to a lower limit position. At the lower limit position, the corresponding stop 44 is at a second end of the corresponding limiting channel 435 with the corresponding second abutment part 442 abutting against the corresponding shoulder 433. In this way, the angular range of movement of the temple 2 relative to the corresponding coupling seat 13 is limited.

In summary, the preferred embodiment of the eyeglasses having a temple mounting structure includes the pair of pivot connection units 3. Each pivot connection unit 3 includes a corresponding pivoting section 21, a corresponding coupling seat 13, a corresponding axle 32, a corresponding axle hole 31, a corresponding first engaging portion 33, and a corresponding second engaging portion 34. The corresponding pivoting section 21 may be rotated to the assembly position relative to the corresponding coupling seat 13, where the corresponding axle 32 may be rotatably inserted into the corresponding axle hole 31. The corresponding pivoting section 21 may then be rotated to engage the corresponding first engaging portion 33 and the corresponding second engaging portion 34 to resist movement of the corresponding pivoting section 21 away from the corresponding coupling seat 13 along the corresponding horizontal pivot axis of the corresponding axle 32 and the corresponding axle hole 31. The corresponding temple 2 that is coupled to the corresponding pivoting section 21 may thus be assembled with the corresponding lens frame unit 1 attached to the coupling seat 13. After assembly, the corresponding temple 2 may be rotated relative to the corresponding coupling seat 13 about the corresponding horizontal pivot axis.

The preferred embodiment further includes the pair of positioning units 4B. Each positioning unit 4B includes a corresponding first positioning portion 41 and a corresponding second positioning portion 42 that may engage to maintain a relative angular position between a corresponding pivoting section 21 and a corresponding coupling seat 13. The preferred embodiment further includes the pair of limiting units 4A. Each limiting unit 4A includes a corresponding stop 44 and a corresponding channel structure 43 that limit the relative angular movement of a corresponding pivoting section 21 and a corresponding coupling seat 13. Accordingly, as described above, the preferred embodiment of the invention includes a temple mounting structure that facilitates assembly.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

What is claimed is:

1. A pair of eyeglasses, comprising:
   a lens frame unit having a pair of lateral sides;
   a pair of temples;
   a pair of pivot connection units, each rotatably coupling a corresponding one of the temples to a corresponding one of the lateral sides of the lens frame unit, each of the pivot connection units including
      a coupling seat coupled to the corresponding one of the lateral sides of the lens frame unit,
      a pivoting section formed on one end of the corresponding one of the temples, an axle formed on one of the pivoting section and the coupling seat and extending along a horizontal pivot axis, the other one of the coupling seat and the pivoting section being formed with an axle opening through which the axle is rotatably inserted to permit rotation of the pivoting section relative to the coupling seat about the horizontal pivot axis, a first engaging portion disposed on the other one of the pivoting section and the coupling seat and extending into the axle opening, and a second engaging portion extending radially and outwardly from the axle and cooperating with the first engaging portion to resist movement of the pivoting section relative to the coupling seat along the horizontal pivot axis; and a pair of limiting units, each limiting angular movement between the pivoting section of a corresponding one of the pivot connection units and the coupling seat of the corresponding one of the pivot connection units, each of the limiting units including a channel structure formed on one of the coupling seat and the pivoting section of the corresponding one of the pivot connection units, and having an entry end and a blocking end that are vertically opposite to each other, and a stop formed on the other one of the coupling seat and the pivoting section of the corresponding one of the pivot connection units, extended into the channel structure via the entry end, movable in the channel structure between the entry end and the blocking end, and limited from further movement in the channel structure by the blocking end.

2. The pair of eyeglasses as claimed in claim 1, wherein the channel structure further has a shoulder disposed between the entry end and the blocking end, a guide channel having a depth that is measured parallel to the horizontal pivot axis and that gradually decreases from the entry end to the shoulder, and a limiting channel confined between the shoulder and the blocking end and deeper than the guide channel, the stop being extended into the channel structure via the entry end and being guided along the guide channel into the limiting channel so as to be movably confined between the shoulder and the blocking end.

3. The pair of eyeglasses as claimed in claim 2, wherein the stop includes a first side having a first abutment part that abuts against the blocking end when the stop is at a first end of the limiting channel, the stop further including a second side having a second abutment part that abuts against the shoulder when the stop is at a second end of the limiting channel.

4. The pair of eyeglasses as claimed in claim 3, wherein the second abutment part has a thickness measured parallel to the horizontal pivot axis and thicker than that of the first abutment part.

5. The pair of eyeglasses as claimed in claim 1, further comprising a pair of positioning units, each including a first positioning portion formed on one of the pivoting section and the coupling seat of a corresponding one of the pivot connection units, and a second positioning portion formed on the other one of the pivoting section and the coupling seat of the corresponding one of the pivot connection units, the first positioning portion and the second positioning portion being engagable to maintain the pivoting section at a selected angle relative to the coupling seat.

6. The pair of eyeglasses as claimed in claim 5, wherein the first positioning portion is formed with a plurality of angularly spaced apart indentations disposed around the corresponding one of the pivot connection units, and the second positioning portion includes a protrusion to engage removably a selected one of the indentations.

7. The pair of eyeglasses as claimed in claim 1, wherein the coupling seat includes an inner coupling face from which the axle extends and on which the channel structure is formed, the pivoting section including an abutment face that faces the inner coupling face, and that is formed with the axle opening and the stop.

8. The pair of eyeglasses as claimed in claim 1, further comprising a pair of positioning units each including a first positioning portion formed on one of the pivoting section and the coupling seat of a corresponding one of the pivot connection units, and a second positioning portion formed on the other one of the pivoting section and the coupling seat of the corresponding one of the pivot connection units, the first positioning portion and the second positioning portion being engagable to maintain the pivoting section at a selected angle relative to the coupling seat.

9. The pair of eyeglasses as claimed in claim 8, wherein the first positioning portion is formed with a plurality of angularly spaced apart indentations disposed around the corresponding one of the pivot connection units, and the second positioning portion includes a protrusion to engage removably a selected one of the indentations.

10. The pair of eyeglasses as claimed in claim 1, wherein the first engaging portion is formed with an engaging channel in spatial communication with the axle opening, and the second engaging portion includes an engaging block that extends from the axle and that is sized for movement through the engaging channel, the first and second engaging portions permitting movement of the pivoting section relative to the coupling seat along the horizontal pivot axis when the engaging block is aligned with the engaging channel in a direction parallel to the horizontal pivot axis.

\* \* \* \* \*